Patented June 16, 1953

2,642,460

UNITED STATES PATENT OFFICE 2,642,460

ISOMERIZATION OF ALKYL VINYL ETHERS

David C. Hull and Hugh J. Hagemeyer, Jr., Kingsport, Tenn., assignors to Eastman Kodak Company, Rochester, N. Y., a corporation of New Jersey No Drawing. Application September 10, 1948, Serial No. 48,764

12 Claims. (Cl. 260—601)

This invention relates to an improved process for isomerizing alkyl vinyl ethers to aliphatic aldehydes.

It is known that aliphatic aldehydes can be prepared by pyrolyzing alkyl vinyl ethers at temperatures in excess of 500° C. in the absence of a catalyst. The product aldehydes are unusually reactive at the temperatures necessary to induce a reaction, however, and tend to undergo polymerization. When lower temperatures are used, the time required to effect pyrolysis is increased, and while undesirable polymerization can be avoided to some extent, the yields of aldehydes are reduced. Such a process is shown in Hasche and Thompson U. S. Patent 2,294,402, dated September 1, 1942.

We have found that lower temperatures can be used to advantage in the pyrolysis of alkyl vinyl ethers to aldehydes, if certain catalysts are present during the heating. The yields obtained exceed those obtainable when no catalyst is used, even though a high temperature is employed. We have also found that undesirable polymerizations are largely avoided when our catalysts are present during the pyrolysis.

Accordingly, it is an object of our invention to provide an improved process for pyrolyzing alkyl vinyl ethers to aldehydes. A further object is to provide a process for obtaining aliphatic aldehydes in increased yields and under conditions not inducive to polymerization. Other objects will become apparent from a consideration of the following description and examples.

We accomplish the above objects by contacting an alkyl vinyl ether with a metallic dehydration catalyst at temperatures not in excess of 400° C.

The alkyl vinyl ethers which can be utilized in our process include methyl vinyl ether, ethyl vinyl ether, n-propyl vinyl ether, n-butyl vinyl ether, n-amyl vinyl ether, etc. (e. g., alkyl vinyl ethers containing from 1 to 5 carbon atoms in the alkyl group). Alkyl vinyl ethers wherein the alkyl group is a primary normal alkyl group have been found to be especially useful.

Some of the metallic dehydration catalysts useful in practicing our invention have previously been used in art in the cracking of motor fuels. Typical catalysts include oxides of aluminum (e. g., activated alumina, the zeolites, complexes of alumina with one or more oxides of silicon, zirconium, thorium, boron, tungsten, etc., lead celite, zinc zeolite, etc.), metal salts (e. g., aluminum, boron, zinc, magnesium, etc.) of an oxygen acid of an element of the fifth or sixth group of the periodic system (e. g., ortho, meta, pyrophosphoric acids), etc. The metal salts are advantageously used in conjunction with one or more of the oxides of aluminum, or they can be impregnated on an inert carrier, e. g. silica gel, pumice, etc. The expression, oxides of aluminum, as used herein, is intended to define aluminum oxide alone, or its complexes with other inorganic substances. Such catalysts generally contain from 25 to 100 per cent by weight of aluminum oxide ($Al_2O_3$), the balance of the catalyst being composed of an inert material, such as silica gel, or one of the other metallic oxides, or metal salts set forth above. Catalysts which can be used in our process have also been described by Thomas, "Journal of the American Chemical Society," vol. 66 (1944), pages 1586 to 1589, Thomas et al. "Journal of the American Chemical Society," vol. 66 (1944), pages 1694 to 1696, and Egloff et al. "Journal of the American Chemical Society," vol. 61 (1939), pages 3571 to 3580. The following patents also describe catalysts which can be used: Thomas et al. 2,229,353, dated January 21, 1941; Thomas et al. 2,242,553, dated May 20, 1941; Thomas et al. 2,270,090 dated January 13, 1942; Ahlberg et al. 2,282,922, May 12, 1942; Thomas et al. 2,285,314, dated June 2, 1942; Thomas et al. 2,287,917 dated June 30, 1942; Thomas et al. 2,329,307 dated September 14, 1943; and Thomas et al. 2,347,648 dated May 2, 1944. Other catalysts useful in practicing our invention are described in Caldwell and Hagemeyer application Serial No. 6347, filed February 4, 1948, now U. S. Patent 2,462,357, dated February 22, 1949.

Although the temperature used in our process varies according to the type of alkyl vinyl ether being isomerized, the presence or absence of a diluent, the length of contact time with the catalyst, etc., we have found that generally the temperature should not exceed 400° C. Generally a temperature from 150° to 400° C. is adequate for the purpose of our invention. At temperatures of from 200° to 300° C. especially good results have been obtained. Since the reaction is highly exothermic, considerable care must be exercised in controlling the reaction temperature. Otherwise charring, gaseous decomposition products, etc., result. Diluents have been found to provide a convenient means for regulating the temperature of the reaction chamber.

As diluents we can use steam, benzene, diphenyl ether, inert gases such as nitrogen, carbon dioxide, etc. Steam has been found to be especially useful due to its high heat content and its stabilizing effect on the aldehydes formed.

The process of our invention can be carried out at elevated pressures, or at pressures below atmospheric pressure. External cooling means can be employed if desired.

The time of contact of the alkyl vinyl ether with the catalyst can be varied, depending on the presence or absence of a diluent, etc. Generally space velocities, which permit a 20 to 50 per cent conversion of the alkyl vinyl ether to the corresponding aldehyde, can be used. This contact time can vary from about 0.5–2.0 seconds for ordinary purposes, although a less or greater contact time can be used without difficulty.

The following examples will illustrate further the manner whereby we practice the process of our invention.

*Example I.—Propionaldehyde*

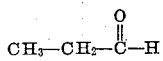

580 g. of methyl vinyl ether were passed through a steam preheater to raise the temperature to from 90° to 100° C. The vapors heated to this temperature were passed into a Pyrex tube measuring one inch outside diameter, which contained alumina gel pellets of one-eighth inch diameter, and the temperature rose to 250° C. The temperature was maintained at 240° to 280° C. by passing steam vapors into the chamber from time to time, although the heat of reaction could be removed by cooling the Pyrex tube with Dowthern (see Hackh's Chemical Dict., 3d ed. 1944). The contact time varied from 0.6–1.0 second. There were thus obtained 302 g. of unreacted methyl vinyl ether in addition to 231 g. of propionaldehyde. Some methyl ethyl acrolein was also obtained.

When a molecularly equivalent amount of n-propyl vinyl ether replaces the methyl vinyl ether in the above example, n-valeraldehyde can be obtained.

*Example II.—n-Butyraldehyde*

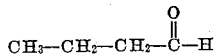

400 g. of ethyl vinyl ether were passed into a Pyrex tube measuring one inch (outside diameter), after preheating the ether at 90° to 100° C. The tube contained 58 ml. of an alumina-thoria gel catalyst in the form of pellets measuring one-eighth inch in diameter. The temperature in the tube was held at 270°–310° C. by the addition of steam. The contact time was 0.6 to 0.8 second. Distillation of the reaction product gave 278 g. of a n-butyraldehyde-water azeotrope, in addition to unchanged ethyl vinyl ether.

The alumina-thoria catalyst used in the above example consisted of 90 per cent by weight of aluminum oxide (alumina) and 10 per cent by weight of thorium oxide (thoria). Such a catalyst can be purchased from manufacturers or can easily be prepared according to known methods (e. g., as described in Caldwell and Hagemeyer U. S. application Serial No. 6347, filed February 4, 1948, now U. S. Patent 2,462,357, dated February 22, 1949).

*Example III.—Propionaldehyde*

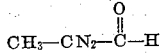

300 g. of methyl vinyl ether were mixed with 300 g. of diphenyl ether (diluent) and the mixture was preheated to reaction temperature, and passed into a Pyrex tube of one inch (outside diameter). The tube contained 60 ml. of activated alumina particles of 4 to 10 mesh, which were impregnated with 5 per cent, by weight, of boron phosphate. The temperature was maintained at 240° to 300° C. by controlling the rate of flow. The contact time was 1.2 to 1.4 seconds. On distillation, the reaction product gave 143 g. of propionaldehyde.

When a molecularly equivalent amount of n-amyl vinyl ether replaces the methyl vinyl ether in the above example, n-oenanthaldehyde can be obtained. Operating in a similar manner, other alkyl vinyl ethers can be isomerized to the corresponding aliphatic aldehydes.

The catalyst used in Example III was prepared by evaporating a slurry of "activated" alumina of 4 to 6 mesh particle size in an aqueous solution of sodium metaborate to dryness. The alumina-sodium metaborate residue was added to a hot 10 per cent solution of orthophosphoric acid, and after filtering off the precipitated alumina-boron phosphate catalyst, it was twice washed with hot distilled water to remove the last traces of sodium phosphate. The catalyst consisted of 95 per cent by weight of alumina and 5 per cent by weight of boron phosphate.

Lead Celite can also be used in the above examples to advantage. Such a catalyst can be prepared by precipitating a soluble lead salt (e. g., lead acetate) in the form of its hydroxide and/or carbonate (e. g., by the addition of sodium hydroxide or sodium carbonate) on a substance such as diatomaceous earth. After washing the solid with distilled water, and drying, it is then heated at 200° to 400° C. to decompose the lead hydroxide and/or carbonate to lead oxide. The finished catalyst should contain from 8 to 10 per cent by weight of lead oxide. Other well known catalysts of the zeolite for Celite type can be used to advantage in our process.

The aldehydes obtained in our process can be oxidized to the corresponding carboxylic acids, thus providing a convenient method for obtaining acids for the acylation of cellulose. For example, propionaldehyde can be oxidized to propionic acid, which can then be reacted with cellulose to give a cellulose propionate.

What we claim as our invention and desire secured by Letters Patent of the United States is:

1. A process for isomerizing an alkyl vinyl ether to an aliphatic aldehyde containing the same number of carbon atoms as said alkyl vinyl ether comprising heating an alkyl vinyl ether containing from 1 to 5 carbon atoms in the alkyl group in the presence of a metallic catalyst consisting of at least one member selected from the group consisting of aluminum oxide, a metal salt of an oxygen acid of phosphorus, a catalyst consisting of aluminum oxide and thorium oxide, a catalyst consisting of aluminum oxide and zirconium oxide, a catalyst consisting of aluminum oxide and boron oxide, a catalyst consisting of aluminum oxide and silicon oxide, and a catalyst consisting of aluminum oxide and tungsten oxide, at a temperature of from 150°–400° C. and a contact time of from 0.5–2.0 seconds.

2. A process for isomerizing an alkyl vinyl ether to an aliphatic aldehyde containing the same number of carbon atoms as said alkyl vinyl ether comprising heating a primary n-alkyl vinyl ether containing from 1 to 5 carbon atoms in the alkyl group in the presence of a metallic catalyst consisting solely of a metallic salt of an oxygen acid of phosphorus at a temperature of from 150°–400° C. and a contact time of from 0.5–2.0 seconds.

3. A process for isomerizing an alkyl vinyl ether to an aliphatic aldehyde containing the same number of carbon atoms as said alkyl vinyl ether comprising heating a primary n-alkyl vinyl ether containing from 1 to 5 carbon atoms in the alkyl group in the presence of a metallic catalyst consisting solely of a metallic salt of an oxygen acid of phosphorus at a temperature of from 150°–400° C. and a contact time of from 0.5–2.0 seconds in the presence of steam.

4. A process for isomerizing an alkyl vinyl ether to an aliphatic aldehyde containing the same number of carbon atoms as said alkyl vinyl ether comprising heating an alkyl vinyl ether containing from 1 to 5 carbon atoms in the alkyl group in the presence of a metallic catalyst consisting solely of aluminum oxide at a temperature of from 150°–400° C. and a contact time of 0.5–2.0 seconds.

5. A process for isomerizing a primary n-alkyl vinyl ether to an aliphatic aldehyde containing the same number of carbon atoms as said alkyl vinyl ether comprising heating a primary n-alkyl vinyl ether containing from 1 to 5 carbon atoms in the alkyl group in the presence of a metallic catalyst consisting solely of aluminum oxide at a temperature of from 150°–400° C. and a contact time of 0.5–2.0 seconds.

6. A process for isomerizing an alkyl vinyl ether to an aliphatic aldehyde containing the same number of carbon atoms as said alkyl vinyl ether comprising heating an alkyl vinyl ether containing from 1 to 5 carbon atoms in the alkyl group in the presence of a metallic catalyst consisting solely of aluminum oxide at a temperature of from 200°–300° C. and a contact time of 0.5–2.0 seconds.

7. A process for isomerizing a primary n-alkyl vinyl ether to an aliphatic aldehyde containing the same number of carbon atoms as said alkyl vinyl ether comprising heating a primary n-alkyl vinyl ether containing from 1 to 5 carbon atoms in the alkyl group in the presence of a metallic catalyst consisting solely of aluminum oxide at a temperature of from 150°–400° C. and a contact time of 0.5–2.0 seconds in the presence of steam.

8. A process for isomerizing an alkyl vinyl ether to an aliphatic aldehyde containing the same number of carbon atoms as said alkyl vinyl ether comprising heating a primary n-alkyl vinyl ether containing from 1 to 5 carbon atoms in the alkyl group in the presence of a metallic catalyst consisting solely of a metallic salt of an oxygen acid of phosphorus, at a temperature of from 200°–300° C. and a contact time of 0.5–2.0 seconds.

9. A process for isomerizing an alkyl vinyl ether to an aliphatic aldehyde containing the same number of carbon atoms as said alkyl vinyl ether comprising heating a primary n-alkyl vinyl ether containing from 1 to 5 carbon atoms in the alkyl group in the presence of a metallic catalyst consisting solely of aluminum oxide and boron phosphate, at a temperature of from 200°–300° C. and a contact time of from 0.5–2.0 seconds.

10. A process for preparing propionaldehyde comprising heating methyl vinyl ether in the presence of a metallic catalyst consisting solely of aluminum oxide at a temperature of from 150°–400° C. and a contact time of from 0.5–2.0 seconds.

11. A process for preparing propionaldehyde comprising heating methyl vinyl ether in the presence of a metallic catalyst consisting solely of aluminum oxide at a temperature of from 200°–300° C. and a contact time of from 0.5–2.0 seconds.

12. A process for preparing propionaldehyde comprising heating methyl vinyl ether in the presence of a metallic catalyst consisting solely of aluminum oxide at a temperature of from 150°–400° C. and a contact time of from 0.5–2.0 seconds in the presence of steam.

DAVID C. HULL.
HUGH J. HAGEMEYER, Jr.

References Cited in the file of this patent

UNITED STATES PATENTS

| Number | Name | Date |
|---|---|---|
| 2,097,154 | Groll et al. | Oct. 26, 1937 |
| 2,294,402 | Hasche et al. | Sept. 1, 1942 |
| 2,477,312 | Parker | July 26, 1949 |
| 2,533,172 | McKinley | Dec. 5, 1950 |

FOREIGN PATENTS

| Number | Country | Date |
|---|---|---|
| 496,840 | Great Britain | Dec. 7, 1938 |

OTHER REFERENCES

Merck's Index, 4th ed., p. 35, 1930.

Berg et al., J. Gen. Chem. (U. S. S. R.) vol. 17, pp. 1618–25 (1947), abstracted in Chem. Abstr., vol. 42, cols. 3649–50.